United States Patent
Purang et al.

(10) Patent No.: US 7,961,189 B2
(45) Date of Patent: *Jun. 14, 2011

(54) DISPLAYING ARTISTS RELATED TO AN ARTIST OF INTEREST

(75) Inventors: Khemdut Purang, San Jose, CA (US); Mark Plutowski, Santa Cruz, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 453 days.

This patent is subject to a terminal disclaimer.

(21) Appl. No.: 11/436,008

(22) Filed: May 16, 2006

(65) Prior Publication Data

US 2007/0282886 A1    Dec. 6, 2007

(51) Int. Cl.
*G06T 11/20* (2006.01)
(52) U.S. Cl. ............ 345/440; 345/418; 345/440.1; 345/440.2; 707/10; 707/100; 707/102; 707/104.1
(58) Field of Classification Search .......... 345/418, 345/440, 440.1, 440.2; 707/102, 100, 10, 707/104.1
See application file for complete search history.

(56) References Cited

U.S. PATENT DOCUMENTS

| | | | |
|---|---|---|---|
| 5,566,291 A | 10/1996 | Boulton et al. | |
| 5,764,239 A * | 6/1998 | Misue et al. | 345/440 |
| 5,963,746 A | 10/1999 | Barker et al. | |
| 6,105,046 A | 8/2000 | Greenfield et al. | |
| 6,208,963 B1 * | 3/2001 | Martinez et al. | 704/232 |
| 6,256,648 B1 * | 7/2001 | Hill et al. | 715/234 |
| 6,282,548 B1 | 8/2001 | Burner et al. | |
| 6,373,484 B1 * | 4/2002 | Orell et al. | 345/420 |
| 6,460,036 B1 | 10/2002 | Herz | |
| 6,473,851 B1 * | 10/2002 | Plutowski | 713/1 |
| 6,484,199 B2 * | 11/2002 | Eyal | 709/223 |
| 6,513,027 B1 | 1/2003 | Powers et al. | |
| 6,539,354 B1 | 3/2003 | Sutton et al. | |
| 6,545,209 B1 | 4/2003 | Flannery et al. | |
| 6,546,135 B1 * | 4/2003 | Lin et al. | 382/190 |
| 6,572,662 B2 * | 6/2003 | Manohar et al. | 715/273 |
| 6,584,456 B1 | 6/2003 | Dom et al. | |
| 6,592,627 B1 | 7/2003 | Agrawal et al. | |
| 6,625,585 B1 | 9/2003 | MacCuish et al. | |
| 6,668,273 B1 | 12/2003 | Rust | |
| 6,714,897 B2 | 3/2004 | Whitney et al. | |
| 6,725,227 B1 * | 4/2004 | Li | 707/102 |
| 6,732,145 B1 | 5/2004 | Aravamudan et al. | |
| 6,738,678 B1 * | 5/2004 | Bharat et al. | 700/48 |
| 6,748,418 B1 | 6/2004 | Yoshida et al. | |

(Continued)

OTHER PUBLICATIONS

Pavel Moravec, Michal Kolovrat, and Vaclav Snasel, "LSI vs. Wordnet Ontology in Dimension Reduction for Information Retrieval", 2004, pp. 18-26, ISBN 80-248-0457-3.

(Continued)

*Primary Examiner* — Andrew Wang
*Assistant Examiner* — Abderrahim Merouan
(74) *Attorney, Agent, or Firm* — Blakely, Sokoloff, Taylor & Zafman LLP

(57) ABSTRACT

A graph of nodes and edges is used to represent artist influence between different artists. Each node of the graph represents an artist. An edge between two nodes represents an influence relationship between two artists. The relative influence between artists is computed for the artists represented in the graph. Furthermore, a weighted artist influence graph is generated based on the computed influences.

24 Claims, 16 Drawing Sheets

U.S. PATENT DOCUMENTS

| | | | |
|---|---|---|---|
| 6,785,688 B2 | 8/2004 | Abajian et al. | |
| 6,801,229 B1 * | 10/2004 | Tinkler | 715/853 |
| 6,941,300 B2 | 9/2005 | Jensen-Grey | |
| 6,952,806 B1 * | 10/2005 | Card et al. | 715/802 |
| 6,996,575 B2 | 2/2006 | Cox et al. | |
| 7,003,515 B1 | 2/2006 | Glaser et al. | |
| 7,085,736 B2 | 8/2006 | Keezer et al. | |
| 7,157,983 B2 | 1/2007 | Tanaka | |
| 7,162,691 B1 | 1/2007 | Chatterjee et al. | |
| 7,165,069 B1 | 1/2007 | Kahle et al. | |
| 7,184,968 B2 | 2/2007 | Shapiro et al. | |
| 7,185,001 B1 | 2/2007 | Burdick et al. | |
| 7,203,698 B2 * | 4/2007 | Yamashita | 707/102 |
| 7,216,129 B2 | 5/2007 | Aono et al. | |
| 7,330,850 B1 | 2/2008 | Seibel et al. | |
| 7,340,455 B2 | 3/2008 | Platt et al. | |
| 7,371,736 B2 | 5/2008 | Shaughnessy et al. | |
| 7,392,248 B2 | 6/2008 | Bakalash et al. | |
| 2001/0045952 A1 * | 11/2001 | Tenev et al. | 345/440 |
| 2002/0035603 A1 | 3/2002 | Lee et al. | |
| 2002/0042793 A1 | 4/2002 | Choi | |
| 2002/0099696 A1 | 7/2002 | Prince | |
| 2002/0099731 A1 * | 7/2002 | Abajian | 707/500 |
| 2002/0099737 A1 | 7/2002 | Porter et al. | |
| 2002/0107827 A1 | 8/2002 | Benitez-Jimenez et al. | |
| 2002/0138624 A1 | 9/2002 | Esenther | |
| 2003/0011601 A1 * | 1/2003 | Itoh et al. | 345/440 |
| 2003/0033318 A1 | 2/2003 | Carlbom et al. | |
| 2003/0041095 A1 * | 2/2003 | Konda et al. | 709/201 |
| 2003/0041108 A1 | 2/2003 | Henrick et al. | |
| 2003/0084054 A1 * | 5/2003 | Clewis et al. | 707/100 |
| 2003/0089218 A1 | 5/2003 | Gang et al. | |
| 2003/0105819 A1 | 6/2003 | Kim et al. | |
| 2003/0154181 A1 | 8/2003 | Liu et al. | |
| 2003/0217335 A1 | 11/2003 | Chung et al. | |
| 2004/0083236 A1 | 4/2004 | Rust | |
| 2004/0090439 A1 * | 5/2004 | Dillner | 345/440 |
| 2004/0117367 A1 | 6/2004 | Smith et al. | |
| 2004/0133555 A1 * | 7/2004 | Toong et al. | 707/2 |
| 2004/0133639 A1 | 7/2004 | Shuang et al. | |
| 2004/0193587 A1 * | 9/2004 | Yamashita | 707/3 |
| 2004/0215626 A1 | 10/2004 | Colossi et al. | |
| 2004/0260710 A1 | 12/2004 | Marston et al. | |
| 2005/0004930 A1 | 1/2005 | Hatta | |
| 2005/0027687 A1 | 2/2005 | Nowitz et al. | |
| 2005/0033807 A1 | 2/2005 | Lowrance et al. | |
| 2005/0044487 A1 | 2/2005 | Bellegarda et al. | |
| 2005/0060332 A1 * | 3/2005 | Bernstein et al. | 707/100 |
| 2005/0060350 A1 | 3/2005 | Baum et al. | |
| 2005/0065773 A1 | 3/2005 | Huang et al. | |
| 2005/0114324 A1 | 5/2005 | Mayer | |
| 2005/0198073 A1 * | 9/2005 | Becks et al. | 707/104.1 |
| 2005/0243736 A1 * | 11/2005 | Faloutsos et al. | 370/254 |
| 2005/0289109 A1 | 12/2005 | Arrouye et al. | |
| 2005/0289168 A1 | 12/2005 | Green et al. | |
| 2006/0004747 A1 | 1/2006 | Weare | |
| 2006/0023724 A1 * | 2/2006 | Na et al. | 370/395.53 |
| 2006/0025175 A1 | 2/2006 | Lapstun et al. | |
| 2006/0031217 A1 | 2/2006 | Smith et al. | |
| 2006/0112141 A1 | 5/2006 | Morris | |
| 2006/0122819 A1 * | 6/2006 | Carmel et al. | 703/21 |
| 2006/0143557 A1 * | 6/2006 | Chan et al. | 715/500 |
| 2006/0167942 A1 | 7/2006 | Lucas et al. | |
| 2006/0218153 A1 * | 9/2006 | Voon et al. | 707/10 |
| 2006/0241869 A1 * | 10/2006 | Schadt et al. | 702/19 |
| 2006/0282789 A1 | 12/2006 | Kim | |
| 2007/0005581 A1 | 1/2007 | Arrouye et al. | |
| 2007/0061319 A1 | 3/2007 | Bergholz | |
| 2007/0100856 A1 | 5/2007 | Ebbesen | |
| 2007/0130194 A1 | 6/2007 | Kaiser | |
| 2007/0192300 A1 | 8/2007 | Reuther et al. | |
| 2007/0233730 A1 | 10/2007 | Johnston | |
| 2007/0245373 A1 | 10/2007 | Shivaji-Rao et al. | |
| 2008/0133466 A1 | 6/2008 | Smith et al. | |
| 2008/0313214 A1 * | 12/2008 | Duhig et al. | 707/102 |
| 2009/0327200 A1 | 12/2009 | Smith et al. | |

OTHER PUBLICATIONS

Ana B. Benitez, John R. Smith, Shih-Fu Chang, "MediaNet: A Multimedia Information Network for Knowledge Representation", in Proc., SPIE, 2001.

Lawrence Reeve and Hyoil Han, "Semantic Annotation for Semantic Social Networks", Using Community Resources, AIS SIGSEMIS Bulletin, vol, 2, Issue (3&4), 2005, pp. 52-56.

Maria Ruiz-Casado, Enrique Alfonseca and Pablo Castells, "Automatic Extraction of Semantic Relationships for WordNet by Means of Pattern Learning From Wikipedia", Castells in Lecture Notes in Computer Science, vol. 3513, 2005.

George A. Miller, Richard Beckwith Christiane Fellbaum, "Introduction to WordNet: An On-Line Lexical Database", Int. J. Lexicography, 1990, vol. 3, pp. 235-244.

Sebastiani, F., "Machine Learning in Automated Text Categorization", Mar. 2002, ACM, vol. 34, Issue 1, pp. 1-47.

Chen, et al., "Predicting Category Accesses for a User in a Structured Information Space", Aug. 2002, ACM, pp. 65-72.

* cited by examiner

150

| 8498618 |
| :---: |
| 152 |
| 0TopOntology-Company-BroadcastStation-TVTokyo |
| 154 |
| 0TopOntology-0RegionAsia-Japan |
| 156 |
| Best, Underway, Sports, GolfCategory, Golf, Art, 0SubCulture, Animation, Family, FamilyGeneration, Child, Kids, Family, FamilyGeneration, Child |
| 158 |
| Kids, Cartoon |
| 160 |
| 20040410 |
| 162 |
| 0930 |
| 164 |
| 1000 |
| 166 |
| 30 |
| 168 |
| $Artist_1, Artist_2, ..., Artist_N$ |
| 170 |

Figure 1B

DISPLAYING ARTISTS RELATED TO AN ARTIST OF INTEREST

This patent application is related to the co-pending U.S. Patent Applications, entitled "CLUSTERING AND CLASSIFICATION OF CATEGORY DATA", application Ser. No. 11/436,142, and "ORDERING ARTISTS BY OVERALL DEGREE OF INFLUENCE", application Ser. No. 11/435,691. The related co-pending applications are assigned to the same assignee as the present application.

TECHNICAL FIELD

This invention relates generally to multimedia, and more particularly using ordering artist associated with multimedia object by degree of influence by other artists.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 2005, Sony Electronics, Incorporated, All Rights Reserved.

BACKGROUND

Clustering and classification tend to be important operations in certain data mining applications. For instance, data within a dataset may need to be clustered and/or classified in a data system with a purpose of assisting a user in searching and automatically organizing content, such as recorded television programs, electronic program guide entries, and other types of multimedia content.

Generally, many clustering and classification algorithms work well when the dataset is numerical (i.e., when datum within the dataset are all related by some inherent similarity metric or natural order). Numerical datasets often describe a single attribute or category. Categorical datasets, on the other hand, describe multiple attributes or categories that are often discrete, and therefore, lack a natural distance or proximity measure between them.

SUMMARY

A graph of nodes and edges is used to represent artist influence between different artists. Each node of the graph represents an artist. An edge between two nodes represents an influence relationship between two artists. The relative influence between artists is computed for the artists represented in the graph. Furthermore, a weighted artist influence graph is generated based on the computed influences.

The present invention is described in conjunction with systems, clients, servers, methods, and machine-readable media of varying scope. In addition to the aspects of the present invention described in this summary, further aspects of the invention will become apparent by reference to the drawings and by reading the detailed description that follows.

BRIEF DESCRIPTION OF THE DRAWINGS

The present invention is illustrated by way of example and not limitation in the figures of the accompanying drawings in which like references indicate similar elements.

FIG. 1B illustrates one embodiment of content metadata.

DETAILED DESCRIPTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

Figure 1A:
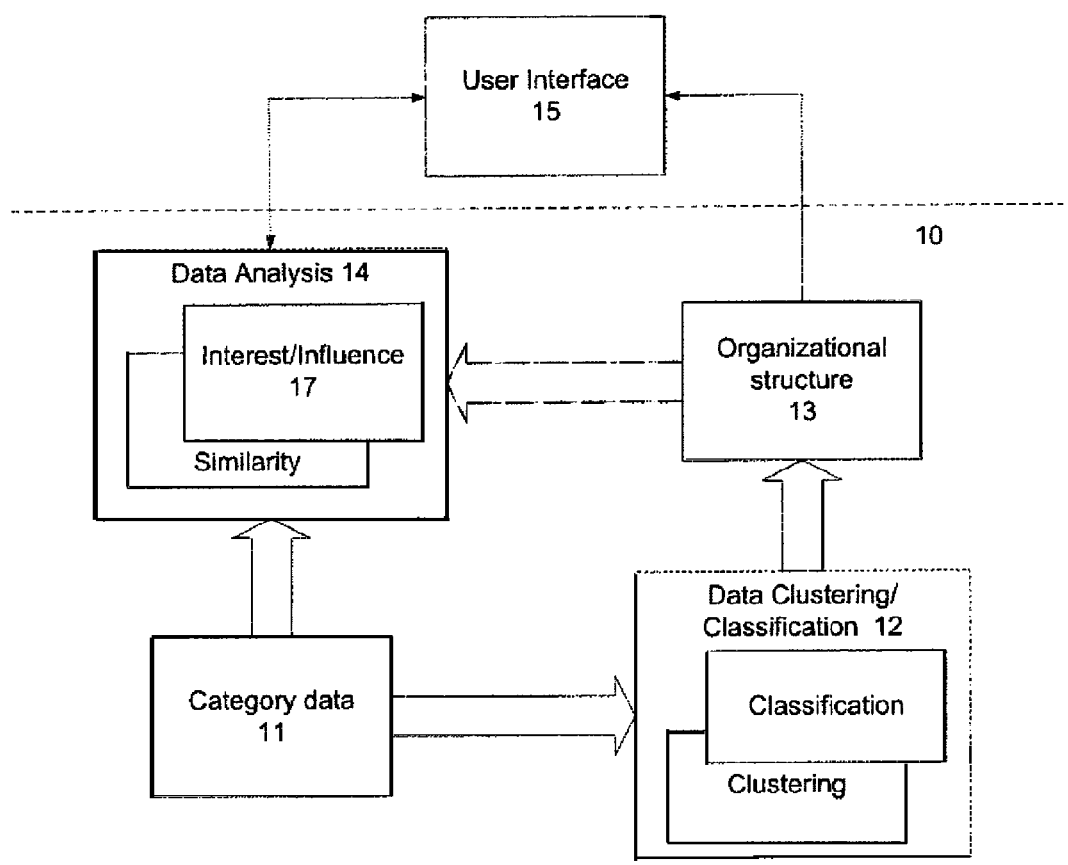
FIG. 1A illustrates one embodiment of a multimedia database system.

FIG. 1A is a diagram of a data system 10 that enables automatic recommendation or selection of information, such as content, which can be characterized by category data 11. Category data describes multiple attributes or categories. Often the categories are discrete and lack a natural similarity measure between them. Thus, category databases could be space because of the discreteness of the categories. Examples of category data include electronic program guide (EPG) data, and content metadata.

The category data 11 is grouped into clusters, and/or classified into folders by the clustering/classification module 12. Details of the clustering and classification performed by module 12 are below. The output of the clustering/classification module 12 is an organizational data structure 13, such as a cluster tree or a dendrogram. A cluster tree may be used as an indexed organization of the category data or to select a suitable cluster of the data.

Many clustering applications require identification of a specific layer within a cluster tree that best describes the underlying distribution of patterns within the category data. In one embodiment, organizational data structure 13 includes an optimal layer that contains a unique cluster group containing an optimal number of clusters.

A data analysis module 14 may use the folder-based classifiers and/or classifiers generated by clustering operations for automatic recommendation or selection of content. The data analysis module 14 may automatically recommend or provide content that may be of interest to a user or may be similar or related to content selected by a user. In one embodiment, a user identifies multiple folders of category data records that categorize specific content items, and the data analysis module 14 assigns category data records for new content items with the appropriate folders based on similarity.

A user interface 15 also shown in FIG. 1A is designed to assist the user in searching and automatically organizing content using the data system 10. Such content may be, for example, recorded TV programs, electronic program guide (EPG) entries, and multimedia content.

Clustering is a process of organizing category data into a plurality of clusters according to some similarity measure among the category data. The module 12 clusters the category data by using one or more clustering processes, including seed based hierarchical clustering, order-invariant clustering, and subspace bounded recursive clustering. In one embodiment, the clustering/classification module 12 merges clusters in a manner independent of the order in which the category data is received.

In one embodiment, the group of folders created by the user may act as a classifier such that new category data records are compared against the user-created group of folders and automatically sorted into the most appropriate folder. In another embodiment, the clustering/classification module 12 implements a folder-based classifier based on user feedback. The folder-based classifier automatically creates a collection of folders, and automatically adds and deletes folders to or from the collection. The folder-based classifier may also automatically modify the contents of other folders not in the collection.

In one embodiment, the clustering/classification module 12 may augment the category data prior to or during clustering or classification. One method for augmentation is by imputing attributes of the category data. The augmentation may reduce any scarceness of category data while increasing the overall quality of the category data to aid the clustering and classification processes.

Although shown in FIG. 1A as specific separate modules, the clustering/classification module 12, organizational data structure 13, and the data analysis module 14 may be implemented as different separate modules or may be combined into one or more modules.

In one embodiment, data analysis module 14 comprises interest/influence module 17 that orders the artists associated with the category data by generating an artist influence graph. One embodiment to order by artist influence is further described in FIGS. 2-6 below. In an alternate embodiment, interest/influence module 17 generate a weighted artist influence graph. One embodiment for generating a weighted artist influence graph is further described in FIGS. 2 and 7-9 below.

FIG. 1B illustrates one embodiment of content metadata 150. Content metadata 150 is information that describes content used by data system 10. In FIG. 1B, content metadata 150 comprises program identifier 152, station broadcaster 154, broadcast region 156, category data 158, genre 160, date 162, start time 164, end time 166, duration 168, and artists 170. Furthermore, content metadata 150 may include additional fields (not shown). Program identifier 152 identifies the content used by data system 10. Station broadcaster 154 and broadcast region 156 identify the broadcaster and the region where content was displayed. In addition, content metadata 150 identifies the date and time the content was displayed with date 162, start time 164, end time 166. Duration 168 is the duration of the content. Furthermore, genre 160 describes the genre associated with the content.

Category data describes the different categories associated with the content. For example, category data 158 comprises terms: Best, Underway, Sports, GolfCategory, Golf, Art, 0SubCulture, Animation, Family, FamilyGeneration, Child, Kids, Family, FamilyGeneration, and Child. As illustrated, category data 158 comprises fifteen terms describing the program. Some of the terms are related, for example, "Sports, GolfCategory, Golf" are related to sports, and "Family, FamilyGeneration, Child, Kids", are related to family. Furthermore, category data 158 includes duplicate terms and possibly undefined terms (0SubCulture). Undefined terms may be only associated with one program, because the definition is unknown and, therefore, not very useful.

Artists 170 comprise the list of artists associated with the program. For example, artists 170 comprise $artist_1$, $artist_2$, . . ., $artist_N$. An artist can be, but not limited to, an actor, actress, producer, director, singer, musician, arranger, composer, choreographer, painter, illustrator, author, etc., and/or any person who adds to the creative content of the program. Thus, there is the possibility of a large number of artists associated with one program.

In addition, there can be a large number of programs available to a customer. For example, a week of television programming could have thousands of programs with thousands of individual terms describing the programs. Therefore, it is possible for a customer to be presented with thousands (or more) artists to choose from in the programs offered through an EPG.

However, a customer is likely to be interested in only a small subset of available artists. The problem lies when a customer would like to access programs with artists that not in the interested subset because of the potentially large number of additional artists.

Artists that influence another artist are referred to as an influencing artists or influencers. Conversely, an artist influenced by another artist referred to as a following artist or follower. An influence means that one artist inspires, teaches, motivates, or otherwise affects another artist. For example, the composer Johan Sebastian Bach influenced Wolfgang Mozart. In turn, Mozart influenced Ludwig Beethoven. Thus, Bach is an influencer of Mozart, and Mozart is a follower of Bach. Similarly, Mozart is an influencer of Beethoven and Beethoven is a follower of Mozart.

Figure 1C:
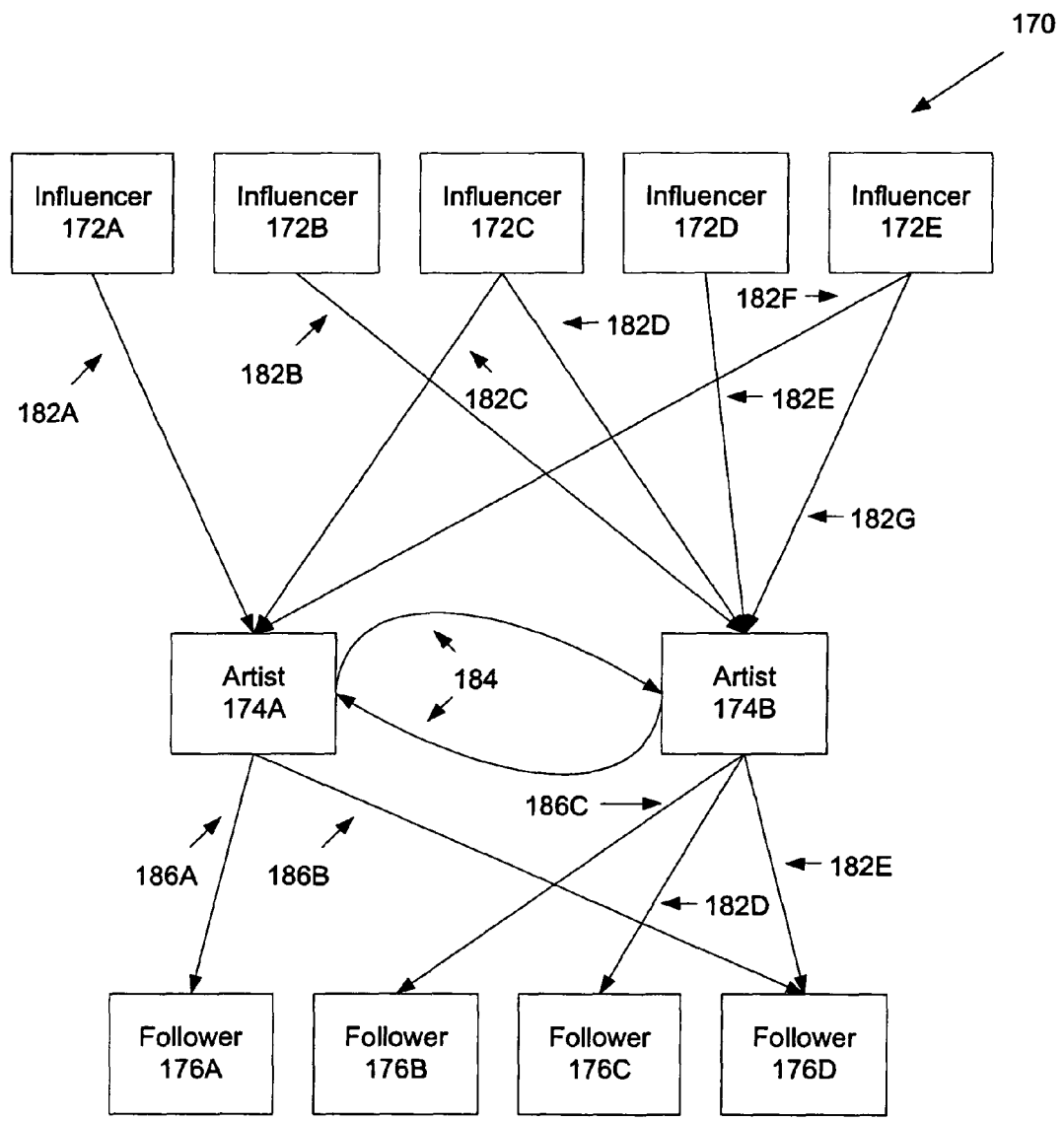
FIG. 1C illustrates one embodiment of artists that are influenced by other artists.

FIG. 1C illustrates one embodiment of graph 170 of artists that are influenced by other artists. Graph 170 comprises a graph of nodes and directed edges. Nodes 172A-E, 174A-B, and 176A-D represent artists. Directed edges 182A-F, 184, and 186A-E represent influencing relationships. The direction of edges 182A-F, 184, and 186A-E is from influencing artists to following artists. Three types of artists are illustrated: influencing artists 172A-E, following artists 176A-D, and artists 174A-B that are both influencers and followers. For example, influencer 172A influences artist 174A through directed edge 182A; influencers 172B, D influence artist 174B through directed edge 182B, 182E; and influencers 172C, D influences both artists 174A-B through directed edges 182C-D, 182F-G. Alternatively, artist 174A follows influencers 172A, C, E through directed edges 182A, C, F and artist 174B follows influencers 172B-E through directed edges 182B, D, E, G. In addition, artist 174A influences followers 176A, D through directed edges 186A-B and artist 174B influences followers 176B-D through directed edges 186C-E. Similarly, follower 176A follows artist 174A through directed edge 186A, follower 176B follows artist 174B through directed edge 186C, and followers 176C-D both follow artist 174A-B through directed edges 186B, D-E. As illustrated, an influencing artist can influence one or more artists. Likewise, a following artist can follow one or more artists.

Artist can be followers and influencers. As illustrated in FIG. 1C, artists 174A-B are both influenced by and influence other artists. Furthermore, an artist can be both a follower and influencer of the same artist. As illustrated, artists 174A-B have both a influencing and following relationship through directed edge 184.

In one embodiment, graph 170 is a basic artist influence graph indicating the type of influence relationship between the artists. In an alternate embodiment, graph 170 is a weighted artist influence graph indicating the type and degree of influence relationship. The degree of relationship represents the strength of influence one artist has on a following artist. The degree of relationship can be represented using visual known in the art, such as, node size, line size, color indicators, font indicators, etc.

Figure 2:
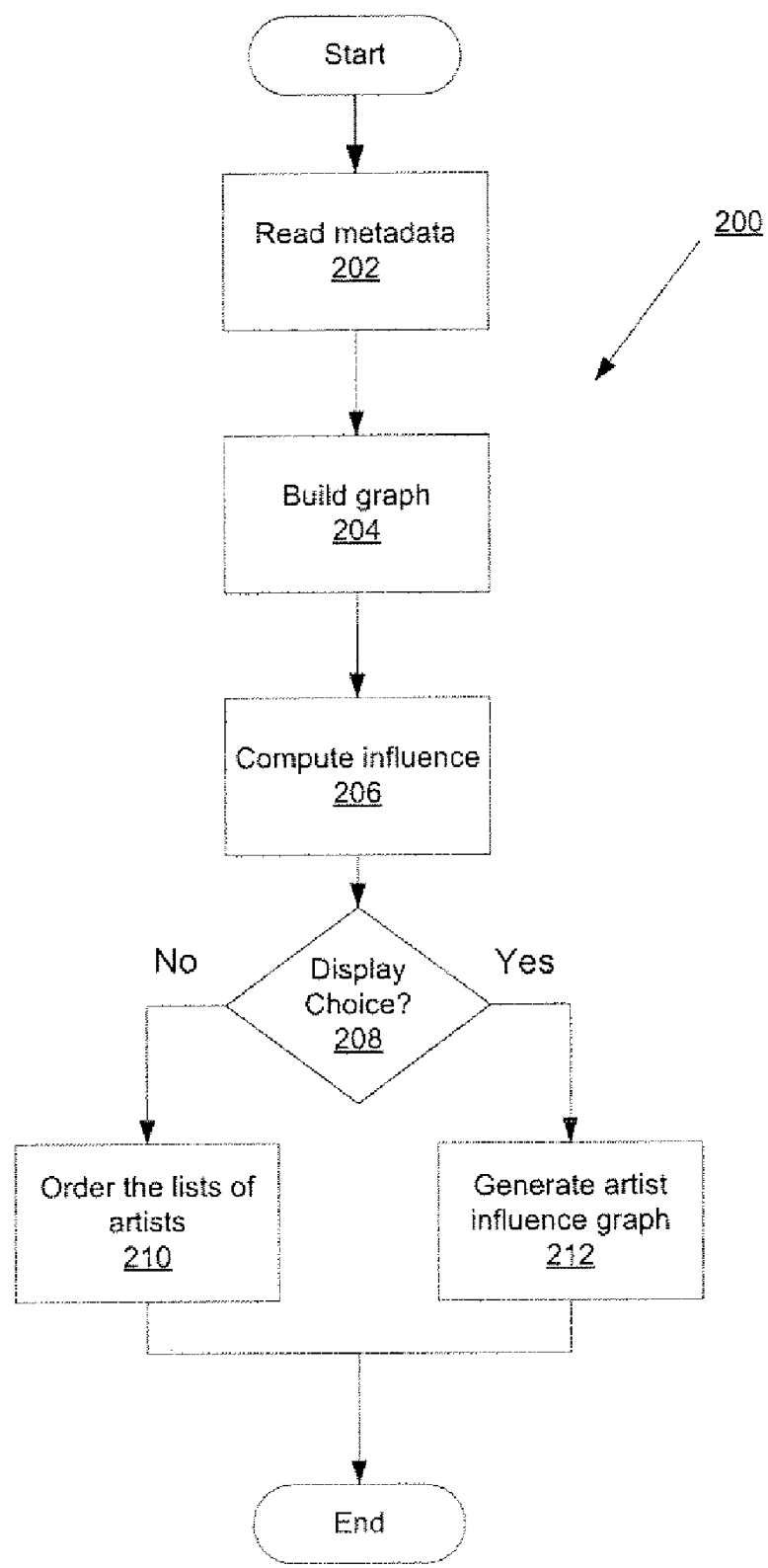
FIG. 2 is a flow chart of one embodiment of a method ordering and displaying artists by overall degree of influence of other artists.

FIG. 2 is a flow chart of one embodiment of a method 200 ordering artists by overall degree of influence of other artists. At block 202, method 200 reads the metadata associated with the content. In one embodiment, the artist metadata is category data 11. Alternatively, the artist metadata is generated from alternate sources, such as artists metadata database, publicly available sources, Wikipedia, GRACENOTE, etc.

At block 204, method 200 builds a basic graph of nodes and edges representing artist influences. The graph nodes represent artists and the graph edges connecting the nodes represent artist influences between the artists. In one embodiment, method 200 computes a graph similar to the one illustrated in FIG. 1C. In an alternative embodiment, the graph is a directed graph with one or more cycles. As stated above, an influence means that one artist inspires, teaches, motivates, or otherwise affects another artist. One embodiment of building an artist influences graph is further described in FIG. 3A below.

At block 206, method 200 computes artists influences. Computing influences involves processing the basic artist influence graph to generate values of influence. Furthermore, influencing artists can have varying amounts of influence on a following artist. For example, one influencing artist could have a stronger influence on a particular following artist another influencing artist. One embodiment of computing influences is furthered described in FIGS. 4-5 below.

At block 208, method 200 determines the display choice for the artist graph. In one embodiment, method 200 orders the lists of artists based on the basic artist influence graph. In another embodiment, method 200 generates a weighted artist influence graph based on the relative artist influences computed at block 206.

If method 200 determines the display choice is to order the artist graph, method 200 orders the list of artists based on the influence values, at block 210. One embodiment for ordering the list of artists is further described in FIG. 6 below.

However, if method 200 determines that the display choice is a weighted artist influence graph, method 200 takes the artist influence graph computed above and regenerates a weighted artist graph, at block 210. The weighted artist influence is an artist graph that comprises data indicating of the degree of influence an influencing artist has relative to a following artist. In one embodiment, method 200 generates the weighted artists influence graph with artist nodes and influencing edges as in FIG. 1C, where the nodes are weighted according influence strength. Alternatively, method 200 represents the weighted artist influence graph in different ways, such as graphically representing the degree of artist influence with visual cues known in the art. One embodiment of displaying the artist influence graph is further described in FIGS. 7-9, below.

In a further embodiment not shown, method 200 orders the lists of artists as described in block 210 and generates a weighted artist influence graph as described in block 212.

Figure 3A:
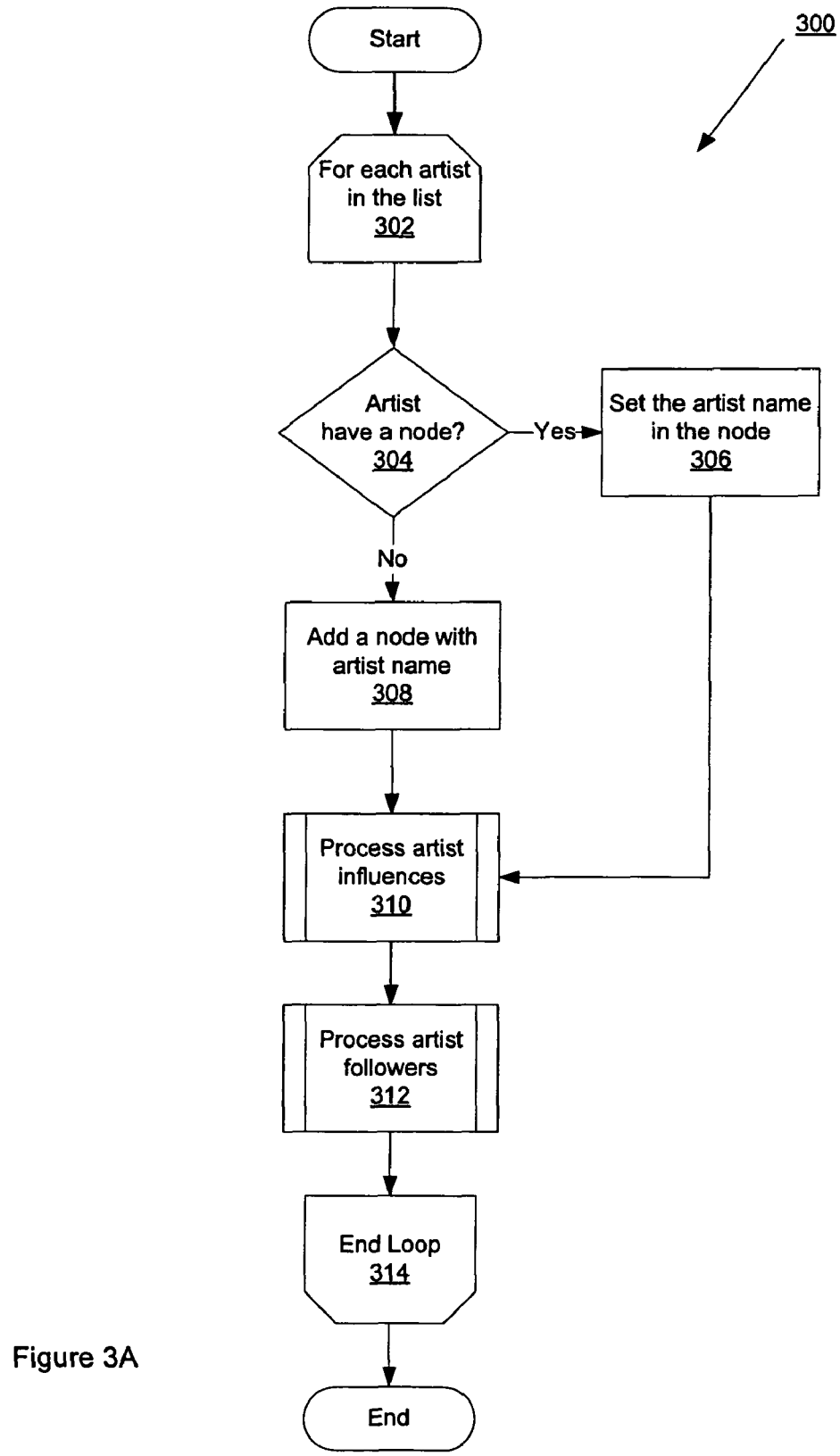
FIG. 3A is a flow chart of one embodiment of a method for building a graph of artists and their influences for use with the method at FIG. 2.

FIG. 3A is a flow chart of one embodiment of a method 300 for building a graph of artists and their influences as illustrated in FIG. 2 at block 204. As stated above, in one embodiment, the artist influence graph is a directed graph with one or more cycles. Alternatively, the graph can be any type of general graph (tree, etc.). Method 300 executes a processing loop (block 302-314) to build the graph. At block 304, method 300 determines if the current artist has a node in the graph. If so, method 300 sets the artist name in the node at block 306. Execution proceeds to block 310.

If the graph does not have a node for the current artist, method 300 adds a node to the graph with the artist name at block 308. In one embodiment, method 300 adds the node to the graph by creating a new node, setting the node name to be the artist name and inserting the node into the graph. Alternatively, method 300 can add nodes representing all the unknown artists to the. Execution proceeds to block 310.

At block 310, method 300 processes the artist influences. One embodiment of processing artist influence is further described in FIG. 3B below. At block 312, method 300 processes the artist followers. One embodiment of processing the artist followers as further described in FIG. 3C below. The processing beginning at 302 ends at block 314.

Figure 3B:
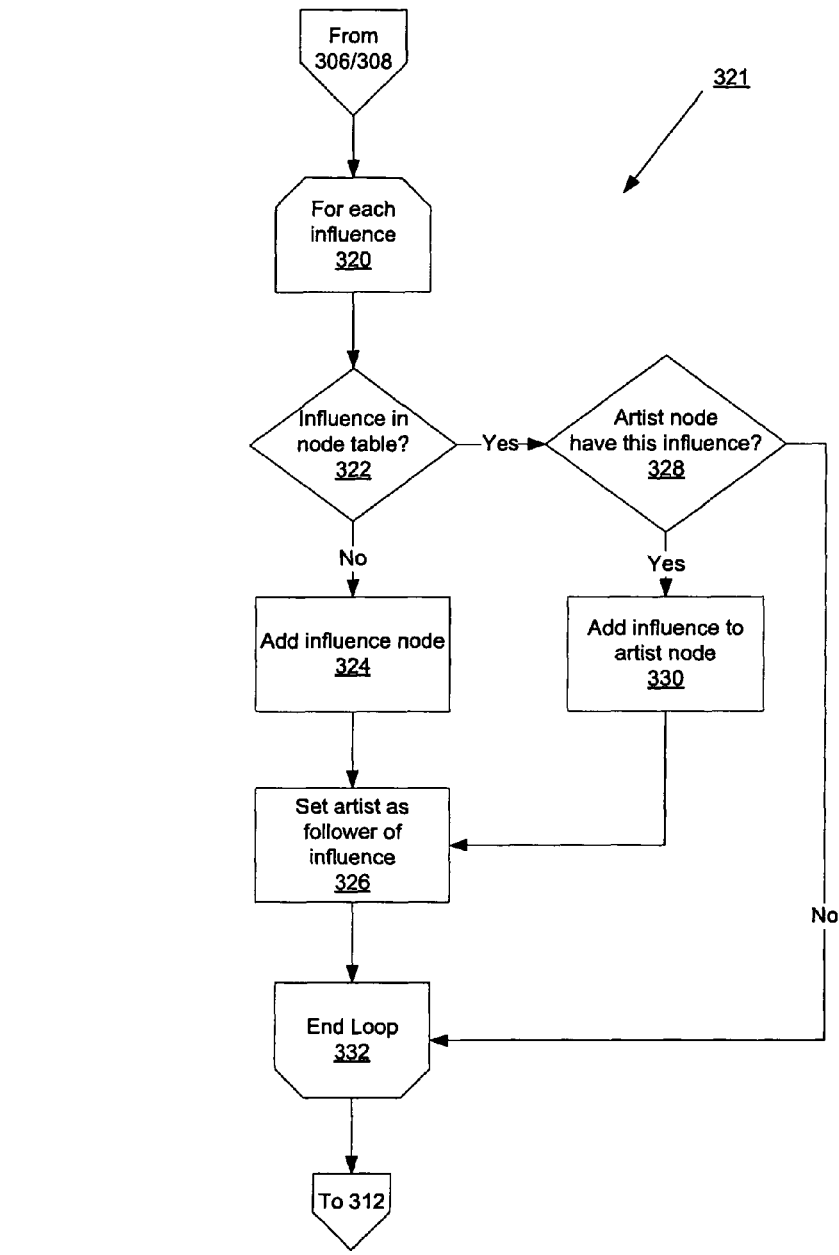
FIG. 3B is a flow chart of one embodiment of a method for adding artist influences to the graph for use with the method at FIG. 3A.

FIG. 3B is a flow chart of one embodiment of a method 321 for adding artist influences to the graph as illustrated in FIG. 3, block 312. Method 321 executes a processing loop (blocks 320-332) to process artist influences for each influencing artist associated with the current artist. At block 322, method 321 determines if the influencing artist is in the node table. A node table is an alternate way to represent the artists. The node table is used to keep track of nodes, and it facilitates processing of artists. If not, method 321 adds the influencing artist in an influence node to the graph at block 324. Execution proceeds to block 326.

If the influencing artist is in the node table, method 321 determines if artist node has this influencer at block 328. If so, at block 330, method 321 adds the influencing artist to the current artist node. By adding the influencing artist to the current artist node, method 321 builds the influencing part of the graph for current artist. Adding the influencing artist allows for the reverse relationship, where the current artist is a follower of the influencing artist. Execution proceeds to block 326. At block 326, method 321 sets the artist as a follower of the influence. The processing loop ends at block 332.

If method 321 determines that the artist node does not have this influencing node, execution proceeds to the end of the loop at block 332.

Figure 3C:
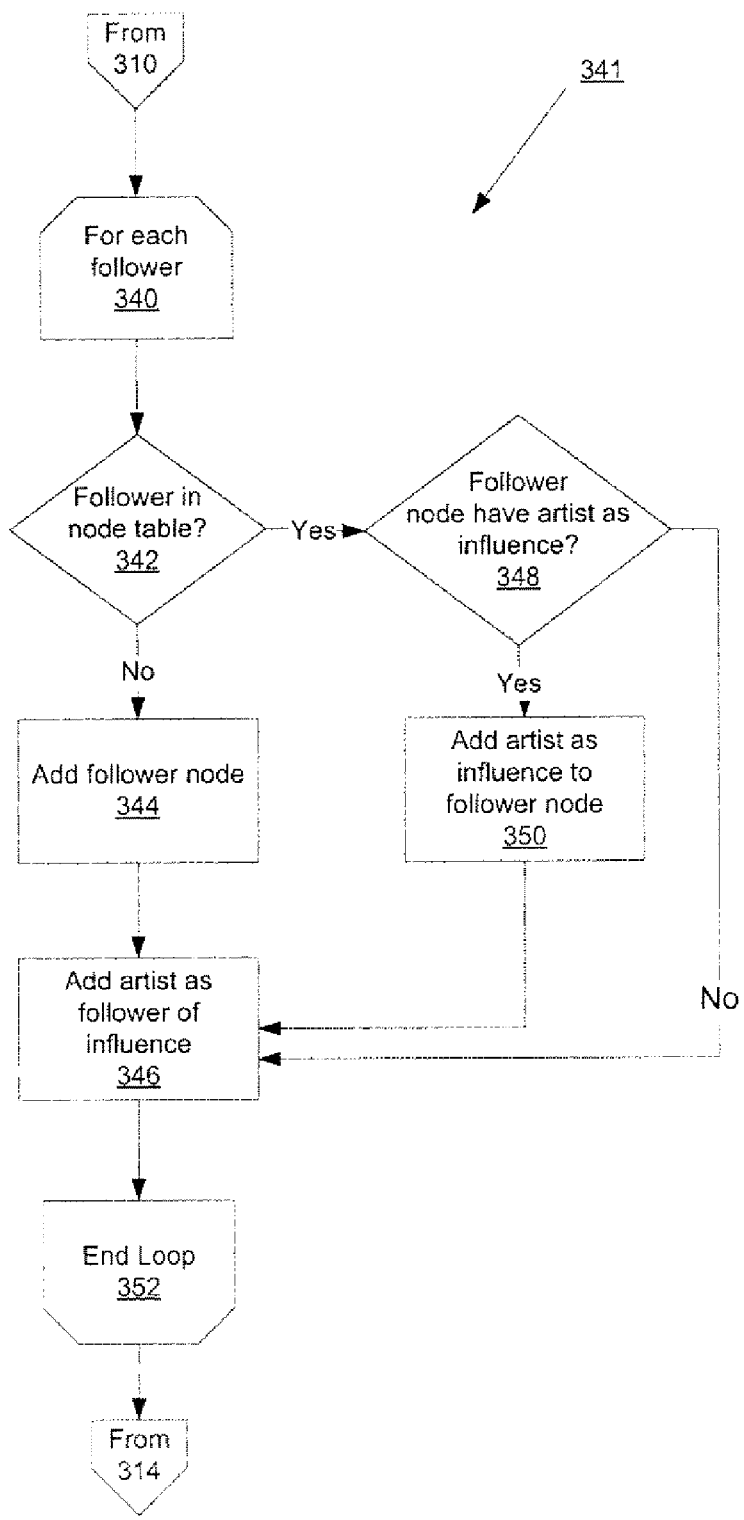
FIG. 3C is a flow chart of one embodiment of a method for adding followers to artists that influence artists for use with the method at FIG. 3A.

FIG. 3C is a flow chart of one embodiment of a method for adding followers to artists that influence artists as illustrated in FIG. 3, block 312. Method 341 executes a processing loop (blocks 340-352) to associate follower nodes to influencing artist nodes. At block 342, method 341 determines if the follower is represented as a node in the node table. If it is, method 341 further determines if the follower node has the influencing artist as an influence at block 348. If the follower node has the artist as an influence, method 341 adds the artist as an influence to the follower node at block 350 and execution proceeds to block 346. If the follower node does not have the artist as an influence, execution proceeds to block 346.

If the follower is not in the follower node table, method 341 adds a follower node to the node table at block 344. Execution proceeds to block 346.

At block 346, method 341 adds the artist as a follower of the influencing artist. By adding the following artist to the current artist node, method 341 builds the follower part of the influence graph for current artist. The processing loop ends at block 352.

Figure 4:
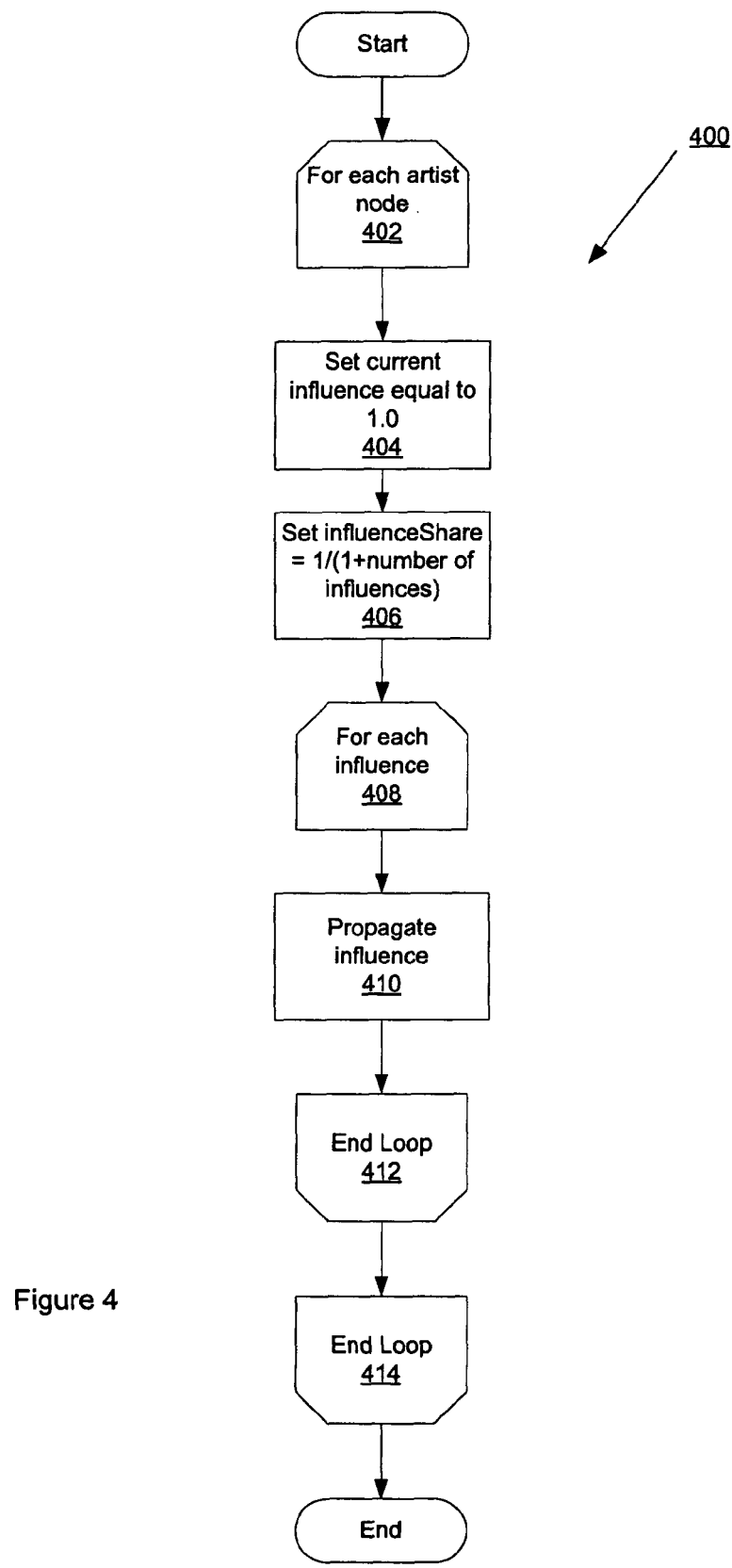
FIG. 4 is a flow chart of one embodiment of a method for computing artist influences for use with the method at FIG. 2.

FIG. 4 is a flow chart of one embodiment of a method for computing artist influences based on the basic artist influence graph as illustrated in FIG. 2, block 206. Method 400 executes an outer processing loop (blocks 402-414) for each artist to compute the artist influences. In one embodiment, an artist's influence on another artist depends on the influence share and the influence values of the influencing artists. Furthermore, the influence share depends on the number of artists influencing the following artist. At block 404, method 400 sets the current influence of the artist equal to 1.0. At block 406, method 400 sets the influence share equal to the inverse of one plus the number of influences associated with current artist.

Method 400 further executes an inner processing loop (blocks 408-412) to propagate the artist influences. Propagating the influences derives the relative weighting of an influencing artist has on a following artist. At block 410, method 400 recursively propagates the influences. One embodiment for propagating the influences is further described in FIG. 5, below. The inner processing loops ends at block 412. Furthermore, the outer processing loop ends at block 414.

Figure 5:
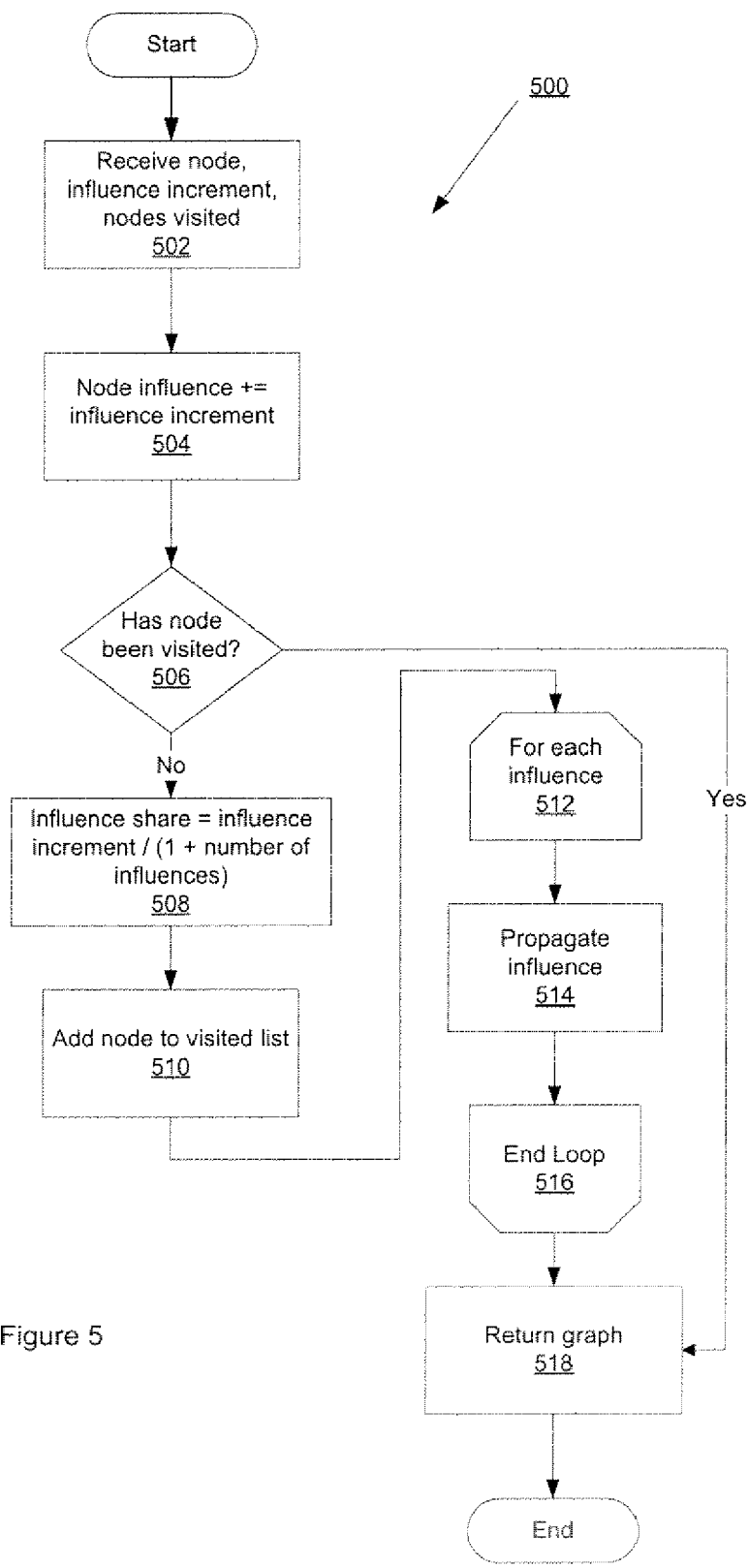
FIG. 5 is a flow chart of one embodiment of a method for propagating the artist influences for use with the method at FIG. 2.

FIG. 5 is a flow chart of one embodiment of a method 500 for propagating the artist influences as illustrated in FIG. 4, block 410. At block 502, method 500 receives the node, influence increment and nodes visited. Method 500 increments the node influence by the influence increment at block 504.

At block 506, method 500 determines whether the node has been visited by method 500. If the node has been visited, method 500 returns the graph at block 518. If the node has not been visited, method 500 sets the influence share equal to the inverse of one plus the number of influences associated with current artist, at block 508. At block 510, method 500 adds the node to the list of nodes visited by method 500.

Furthermore, method 500 executes a processing loop (blocks 512-516) to further propagate the influences for each influence of the current node. At block 514, method 500 recursively propagates the influences for the current influencing node being processed by the loop by executing blocks 502-518 of FIG. 5. The processing loop ends at block 516. Execution proceeds to block 518. At block 518, method 500 returns the graph generated by method 500.

Figure 6:
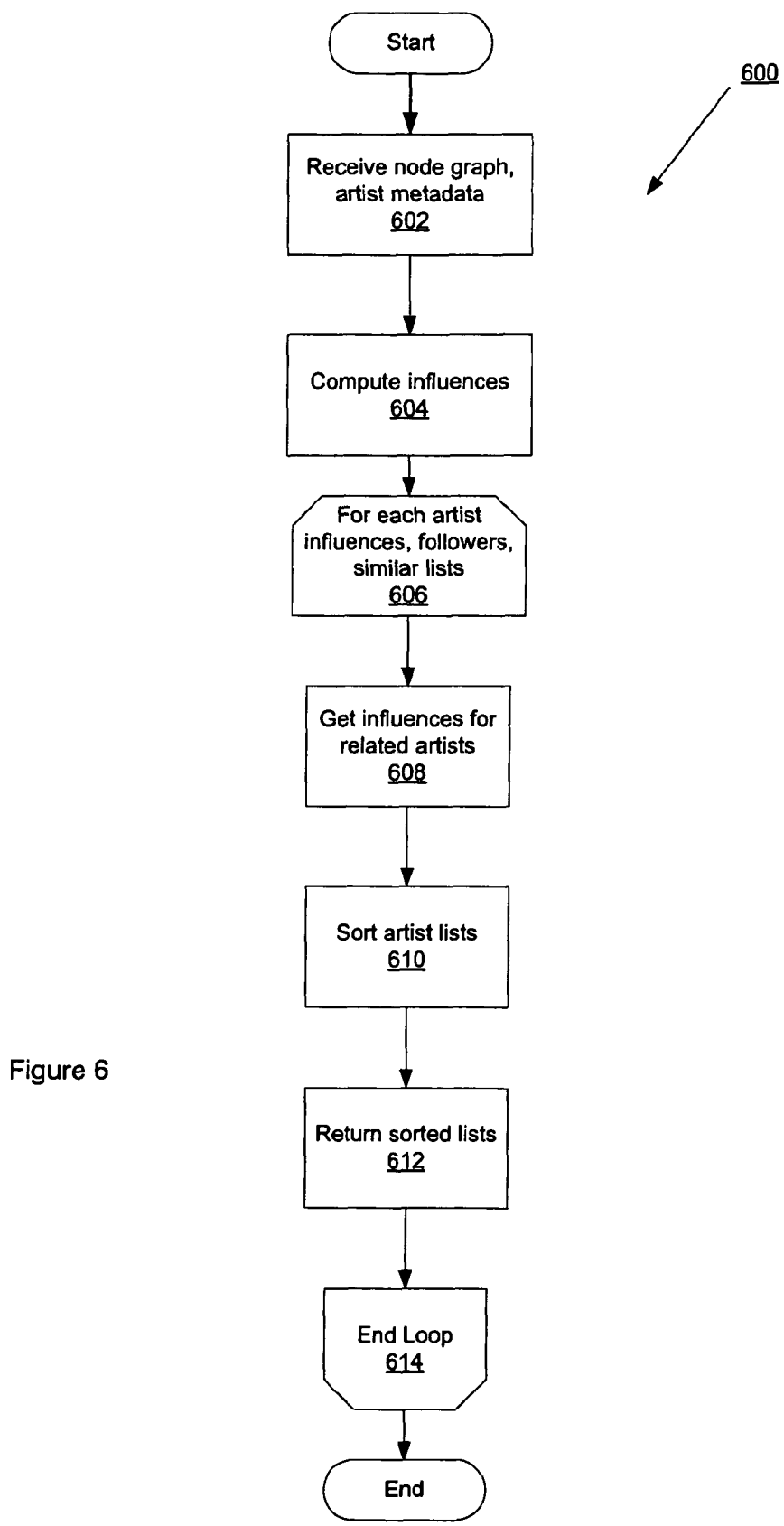
FIG. 6 is a flow chart of one embodiment of a method for ordering the artists by influence, followers, and other similar lists for use with the method at FIG. 2.

FIG. 6 is a flow chart of one embodiment of a method for ordering the artists by influence, followers, and similar lists based on the basic artist influence graph as illustrated in FIG. 2, block 210. At block 602, method 600 receives the basic artist influence graph and artist metadata. In one embodiment, the artist metadata comprises other influencing and following artists. Alternatively, the artist metadata includes other data that describes the artists (producer, director, record label, etc.). At block 604, method 600 computes the artists influences. Computing the artist influences is further described in FIG. 4 above.

Method 600 further executes a processing loop (blocks 606-614) to sort the artists lists for each artist influence, artist follower and other similar lists. At block 608, method 600 gets the influences for related artists. In one embodiment related artists are the influencing and following artists for the current artists. Alternatively, related artists can be related by the same and/or different criteria (genre, year, etc.). Using the related artists, method 600 sorts the artist list at block 610. In one embodiment, method 600 sorts the artists by influencing artists, then following artists. Alternatively, method 600 sorts the artist using the same, more, less, and/or different criteria and combinations related to any of the metadata types associated with the artists (genre, year, etc.). At block 612, method 600 returns the sorted lists. The processing loop ends at block 614.

FIGS. 3-6, above, are directed to computing a basic artist influence graph that contains the relationship between influencing and following artists, as well as the degree of those relationships. The basic artist influence graph relates a number of artists together. Because of the potentially large number of artists and the relationships involved, an artist influence graph can use visual cues known in the art to display the graph.

Figure 7:
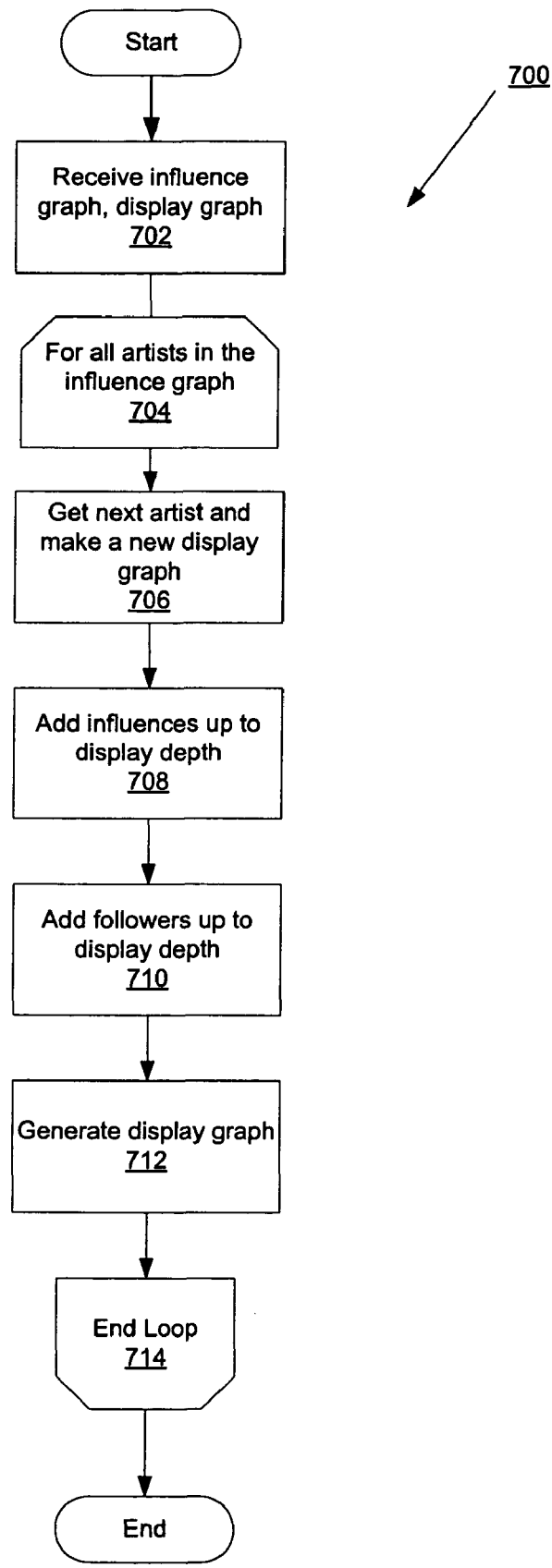
FIG. 7 is a flow chart of one embodiment of a method for displaying an artist influence graph for use with the method at FIG. 2.

FIG. 7 is a flow chart of one embodiment of a method 700 for generating a weighted artist influence graph as illustrated in FIG. 2, block 212. In one embodiment, the weighted artist influence graph is a directed graph with one or more cycles. Alternatively, the graph can be any type of general graph (tree, etc.). At block 702, method 700 receives the basic artist influence graph and the weighted artist influence graph.

Method 700 further executes a processing loop (blocks 704-714) to generate the weighted artist influence graph based on the artists in the basic artist influence graph. At block 706, method 700 gets the next artist from the basic artist influence graph and creates a new weighted artist influence graph for that artist. At block 708, method 700 adds the influencing artist to the weighted artist influence graph up to the display depth. The display depth restricts the number of influencing artists to be displayed. The display depth may be large enough to allow display of all of the influencing artists, or only some influencing artists. One embodiment for adding influencing artists is further described in FIG. 8, below. Likewise, method 700 adds following artists to the weighted artist influence graph up to the display depth at block 710. The display depth for the following artists may or may not be the same as the display depth for the following artists. As with the influencing artist display depth, the following artist display depth may be large enough to allow display of all of the following artists, or only some following artists. One embodiment for adding following artists is further described at FIG. 9, below. At block 712, method 700 generates the weighted artist influence graphs for display on the user interface. The processing loop ends at block 714.

Figure 8:
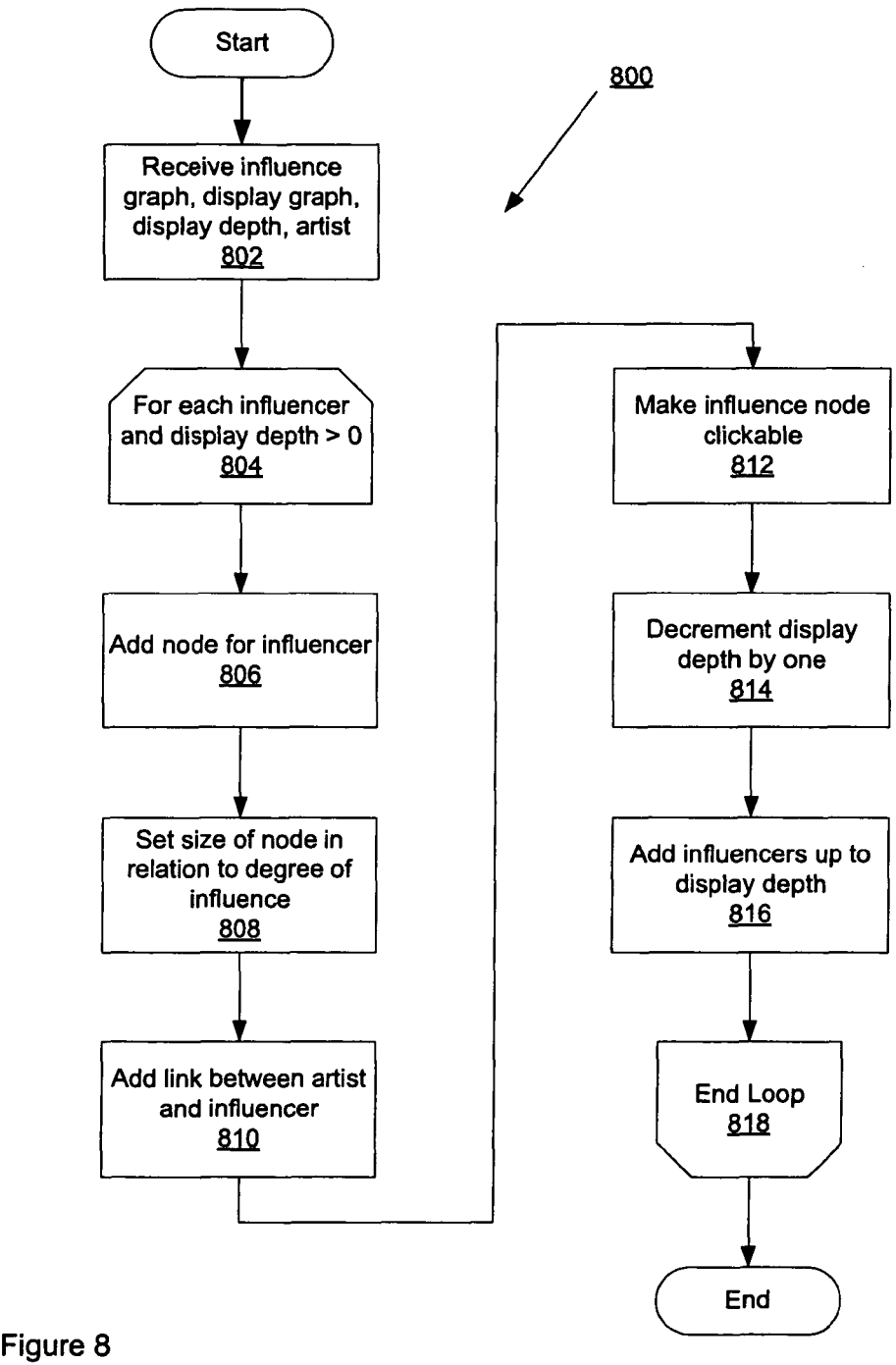
FIG. 8 is a flow chart of one embodiment of a method for adding influencing artist to the weighted artist influence graph for use with the method at FIG. 7.

FIG. 8 is a flow chart of one embodiment of a method 800 for adding influencing artists to the weighted artist influence graph. At block 802, method 800 receives the basic artist influence graph, the current weighted artist influence graph, the influencing artist display depth, and the artist. Method 800 further executes a processing loop (blocks 804-818) to add influencing artists to the weighted artist influence graph for each influencing artist while the display depth is greater than zero. At block 806, method 800 adds a node for the influencing artist to the weighted artist influence graph. Method 800 sets the size of the node in relation to the degree of influence the influencing artist has on current artist at block 808.

At block 810, method 800 adds an edge between the current artist node and the influencing artist node. Adding an edge indicates the influencing relationship between the current and influencing artist. In addition, the relative size of the influencing node indicates the relative influence the influencing artist has on the current artist. At block 812, method 800 makes the influencing node clickable, so as to allow access of information associated with the influencing node. In one embodiment where the weighted artist influence graph is displayed, clicking on the influencing node allows a user to access the weighted artist influence graph of the influencing node. Alternatively, clicking on the influencing node produces the same and/or different actions (displays information about the influencing node such as, but not limited to, influencing artist biography, discography, etc.). At block 814, method 800 decrements the display depth by one. Method 800 recursively adds additional influencing artists to the weighted artist influence graph up to the display depth at block 816. Alternatively, method 800 adds additional influencing artists using non-recursively way known in the art at block 816. The processing loop ends at block 818.

Figure 9:
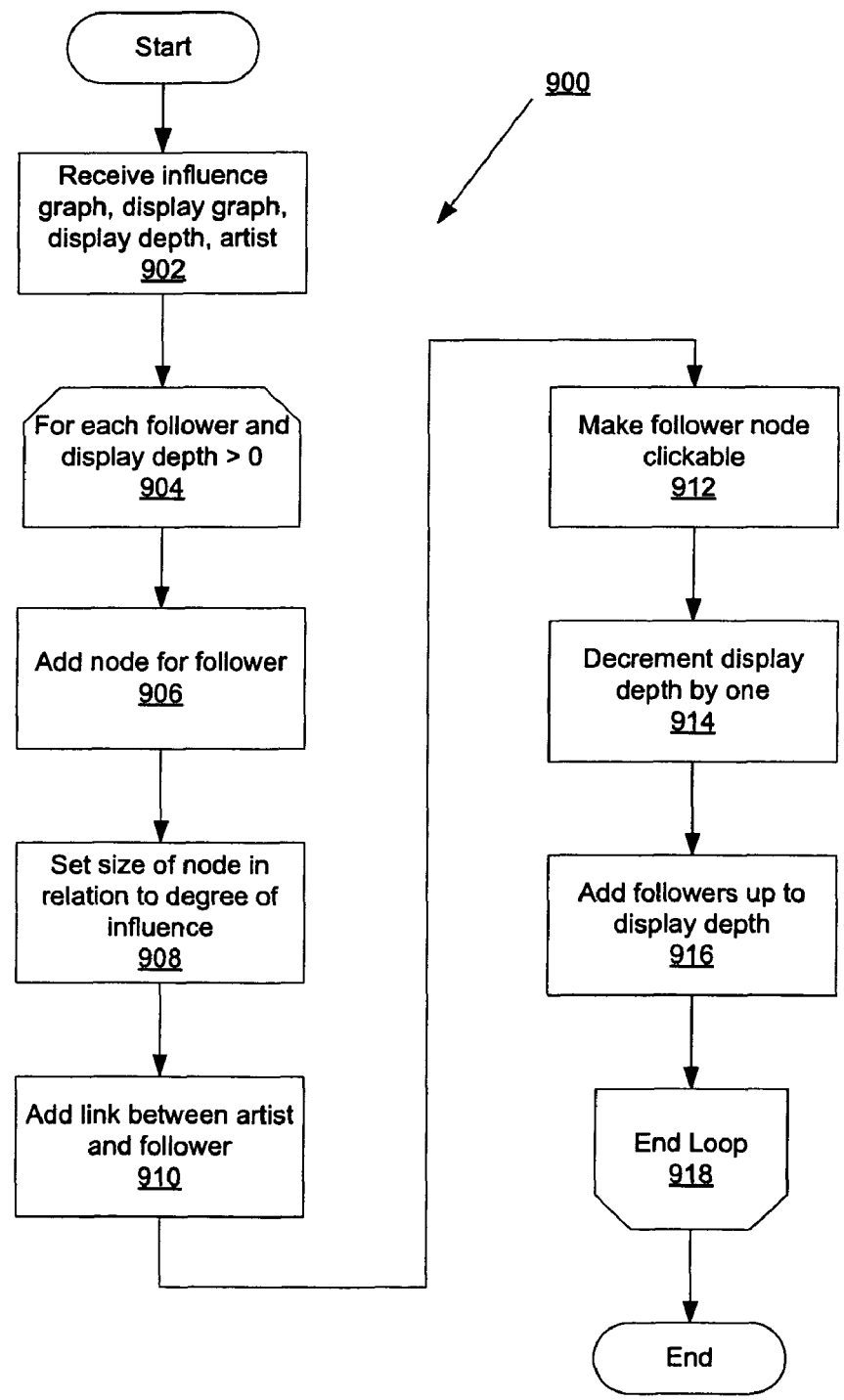
FIG. 9 is a flow chart of one embodiment of a method for adding following artist to the weighted artist influence graph for use with the method at FIG. 7.

FIG. 9 is a flow chart of one embodiment of a method 900 for adding following artists to the weighted artist influence graph. At block 902, method 900 receives the basic artist influence graph, the current weighted artist influence graph, the following artist display depth, and the artist. Method 900 further executes a processing loop (blocks 904-918) to add following artists to the weighted artist influence graph for each following artist while the display depth is greater than zero. At block 906, method 900 adds a node for the following artist to the weighted artist influence graph. Method 900 sets the size of the node in relation to the degree of influence the following artist has on current artist at block 908.

At block 910, method 900 adds a link between the current artist node and the following artist node. Adding an edge indicates the following relationship between the current and following artist. In addition, the relative size of the following node gives an indication of the relative influence the current artist has on the following artist. At block 912, method 900 makes the following node clickable, so as to allow access of information associated with the following node. In one embodiment where the weighted artist influence graph is displayed, clicking on the following node allows a user to access the weighted artist influence graph of the following node. Alternatively, clicking on the following node produces the same and/or different actions (displays information about the following node such as, but not limited to, following artist biography, discography, etc.).

At block 914, method 900 decrements the display depth by one. In one embodiment, method 900 recursively adds additional following artists to the weighted artist influence graph up to the display depth at block 916. Alternatively, method 900 adds additional following artists using non-recursively way known in the art at block 916. The processing loop ends at block 918.

Figure 10:
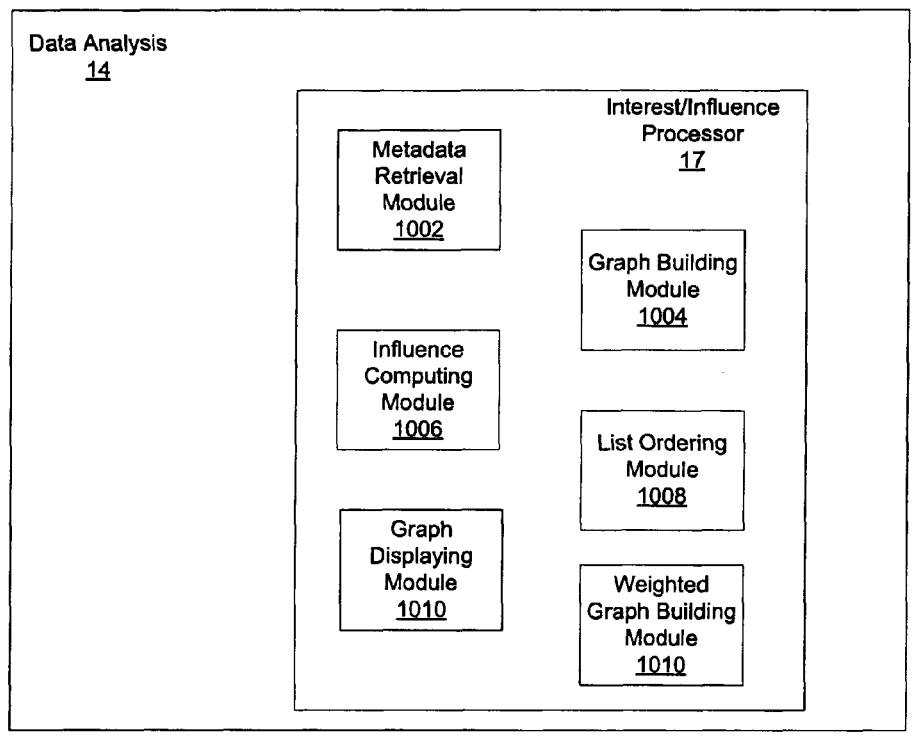
FIG. 10 is a block diagram illustrating one embodiment of a device that orders and displays artists by overall degree of influence of other artists.

FIG. 10 is a block diagram illustrating one embodiment of a device that orders and displays artists by overall degree of influence of other artists. In one embodiment, data analysis module 14 contains interest/influence module 110. Alternatively, data analysis module 14 does not contain interest/influence module 110, but is coupled to interest/influence module 110. Interest/influence module 110 comprises metadata retrieval module 1002, graph building module 1004, influence computing module 1006, list ordering module 1008, and weighted graph building module 1010. Metadata retrieval module 1002 retrieves metadata from the category data 10 as described in FIG. 2, block 202. Graph building module 1004 generates the basic artists influence graph as described in FIG. 2, block 204. Influence computing module 1006 computes artist influence as described in FIG. 2, block 206. List ordering module 1008 orders the list as described in FIG. 2, block 210. Weighted graph building module generates the weighted artist influence graph as described in FIG. 2, block 212.

Figure 11:
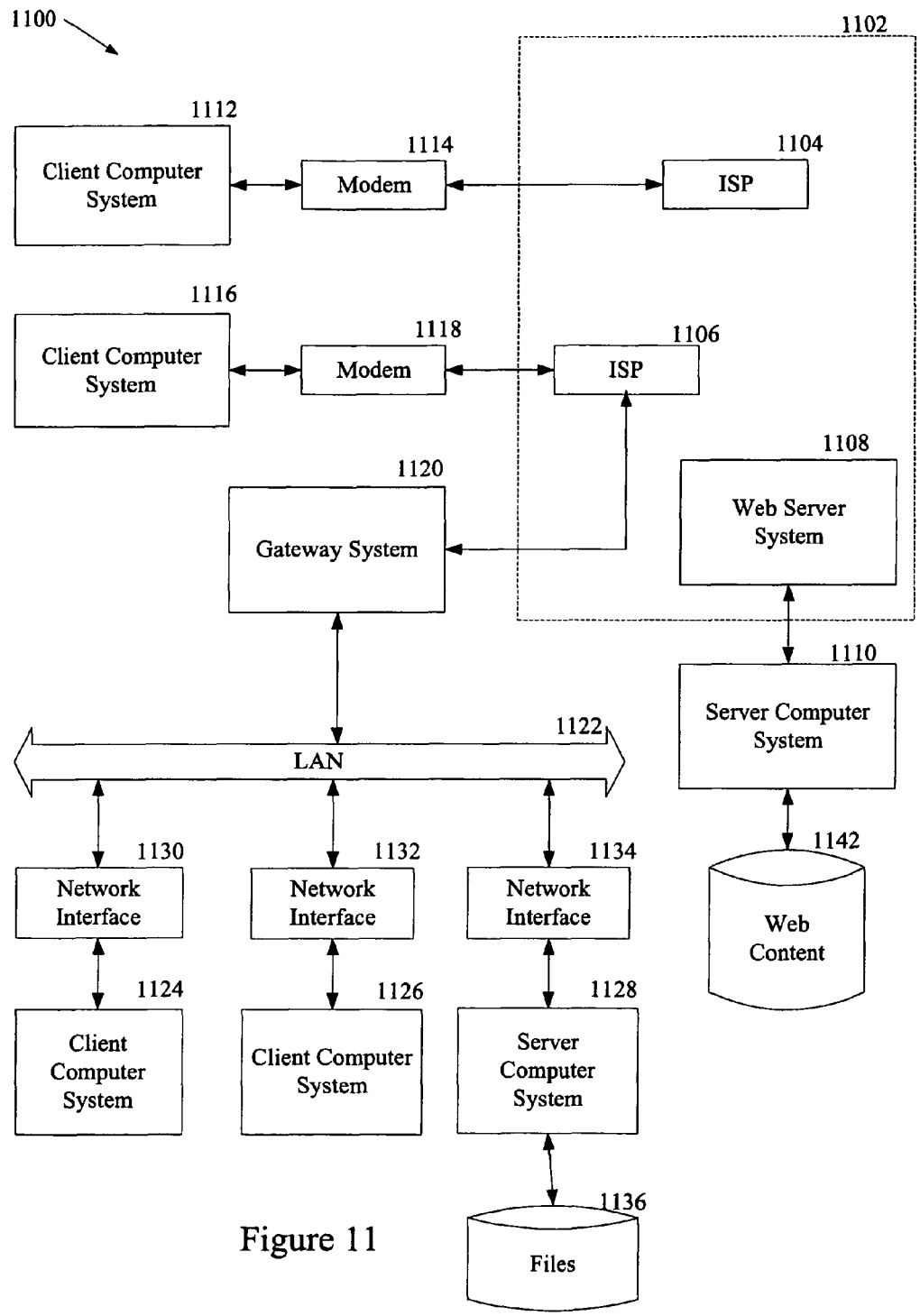
FIG. 11 is a diagram of one embodiment of an operating environment suitable for practicing the present invention.
Figure 12:
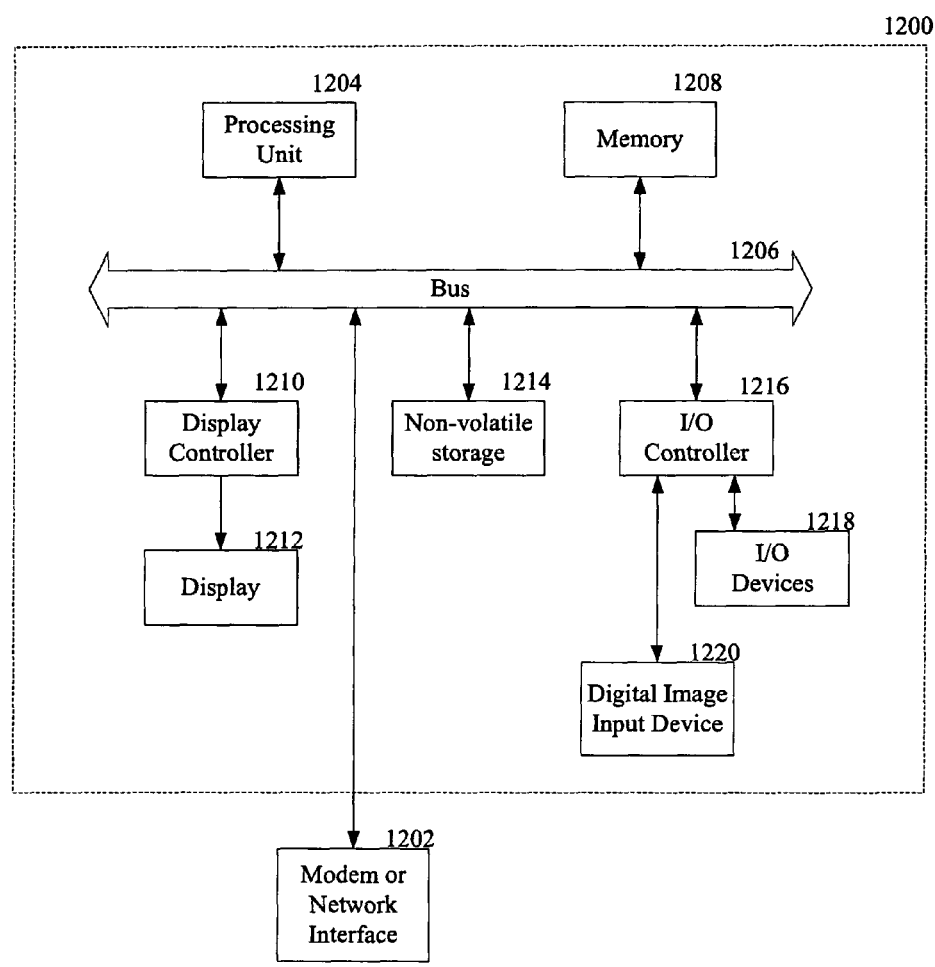
FIG. 12 a diagram of one embodiment of a computer system suitable for use in the operating environment of FIGS. 2-4.

The following descriptions of FIGS. 11-12 is intended to provide an overview of computer hardware and other operating components suitable for performing the methods of the invention described above, but is not intended to limit the applicable environments. One of skill in the art will immediately appreciate that the embodiments of the invention can be practiced with other computer system configurations, including hand-held devices, multiprocessor systems, microprocessor-based or programmable consumer electronics, network PCs, minicomputers, mainframe computers, and the like. The embodiments of the invention can also be practiced in distributed computing environments where tasks are performed by remote processing devices that are linked through a communications network, such as peer-to-peer network infrastructure.

In practice, the methods described herein may constitute one or more programs made up of machine-executable instructions. Describing the method with reference to the flowchart in FIGS. 2-6 enables one skilled in the art to develop such programs, including such instructions to carry out the operations (acts) represented by logical blocks on suitably configured machines (the processor of the machine executing the instructions from machine-readable media). The machine-executable instructions may be written in a computer programming language or may be embodied in firmware logic or in hardware circuitry. If written in a programming language conforming to a recognized standard, such instructions can be executed on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, process, application, module, logic . . . ), as taking an action or causing a result. Such expressions are merely a shorthand way of saying that execution of the software by a machine causes the processor of the machine to perform an action or produce a result. It will be further appreciated that more or fewer processes may be incorporated into the methods illustrated in the flow diagrams without departing from the scope of the invention and that no particular order is implied by the arrangement of blocks shown and described herein.

FIG. 11 shows several computer systems 1100 that are coupled together through a network 1102, such as the Internet. The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (web). The physical connections of the Internet and the protocols and communication procedures of the Internet are well known to those of skill in the art. Access to the Internet 1102 is typically provided by Internet service providers (ISP), such as the ISPs 1104 and 1106. Users on client systems, such as client computer systems 1112, 1116, 1124, and 1126 obtain access to the Internet through the Internet service providers, such as ISPs 1104 and 1106. Access to the Internet allows users of the client computer systems to exchange information, receive and send e-mails, and view documents, such as documents which have been prepared in the HTML format. These documents are often provided by web servers, such as web server 1108 which is considered to be "on" the Internet. Often these web servers are provided by the ISPs, such as ISP 1104, although a computer system can be set up and connected to the Internet without that system being also an ISP as is well known in the art.

The web server 1108 is typically at least one computer system which operates as a server computer system and is configured to operate with the protocols of the World Wide Web and is coupled to the Internet. Optionally, the web server 1108 can be part of an ISP which provides access to the Internet for client systems. The web server 1108 is shown coupled to the server computer system 1110 which itself is coupled to web content 1142, which can be considered a form of a media database. It will be appreciated that while two computer systems 1108 and 1110 are shown in FIG. 11, the web server system 1108 and the server computer system 1110 can be one computer system having different software components providing the web server functionality and the server functionality provided by the server computer system 1110 which will be described further below.

Client computer systems 1112, 1116, 1124, and 1126 can each, with the appropriate web browsing software, view HTML pages provided by the web server 1108. The ISP 1104 provides Internet connectivity to the client computer system 1112 through the modem interface 1114 which can be considered part of the client computer system 1112. The client computer system can be a personal computer system, a network computer, a Web TV system, a handheld device, or other such computer system. Similarly, the ISP 1106 provides Internet connectivity for client systems 1116, 1124, and 1126, although as shown in FIG. 11, the connections are not the same for these three computer systems. Client computer system 1116 is coupled through a modem interface 1118 while client computer systems 1124 and 1126 are part of a LAN. While FIG. 11 shows the interfaces 1114 and 1118 as generically as a "modem," it will be appreciated that each of these interfaces can be an analog modem, ISDN modem, cable modem, satellite transmission interface, or other interfaces for coupling a computer system to other computer systems. Client computer systems 1124 and 1116 are coupled to a LAN 1122 through network interfaces 1130 and 1132, which can be Ethernet network or other network interfaces. The LAN 1122 is also coupled to a gateway computer system 1120 which can provide firewall and other Internet related services for the local area network. This gateway computer system 1120 is coupled to the ISP 1106 to provide Internet connectivity to the client computer systems 1124 and 1126. The gateway computer system 1120 can be a conventional server computer system. Also, the web server system 1108 can be a conventional server computer system.

Alternatively, as well-known, a server computer system 1128 can be directly coupled to the LAN 1122 through a network interface 1134 to provide files 1136 and other services to the clients 1124, 1126, without the need to connect to the Internet through the gateway system 1120. Furthermore, any combination of client systems 1112, 1116, 1124, 1126 may be connected together in a peer-to-peer network using LAN 1122, Internet 1102 or a combination as a communications medium. Generally, a peer-to-peer network distributes data across a network of multiple machines for storage and retrieval without the use of a central server or servers. Thus, each peer network node may incorporate the functions of both the client and the server described above.

FIG. 12 shows one example of a conventional computer system that can be used as encoder or a decoder. The computer system 1200 interfaces to external systems through the modem or network interface 1202. It will be appreciated that the modem or network interface 1202 can be considered to be part of the computer system 1200. This interface 1202 can be an analog modem, ISDN modem, cable modem, token ring interface, satellite transmission interface, or other interfaces for coupling a computer system to other computer systems. The computer system 1202 includes a processing unit 1204, which can be a conventional microprocessor such as an Intel Pentium microprocessor or Motorola Power PC microprocessor. Memory 1208 is coupled to the processor 1204 by a bus 1206. Memory 1208 can be dynamic random access memory (DRAM) and can also include static RAM (SRAM). The bus 1206 couples the processor 1204 to the memory 1208 and also to non-volatile storage 1214 and to display controller 1210 and to the input/output (I/O) controller 1216. The display controller 1210 controls in the conventional manner a display on a display device 1212 which can be a cathode ray tube (CRT) or liquid crystal display (LCD). The input/output devices 1218 can include a keyboard, disk drives, printers, a scanner, and other input and output devices, including a mouse or other pointing device. The display controller 1210 and the I/O controller 1216 can be implemented with conventional well known technology. A digital image input device 1220 can be a digital camera which is coupled to an I/O controller 1216 in order to allow images from the digital camera to be input into the computer system 1200. The non-volatile storage 1214 is often a magnetic hard disk, an optical disk, or another form of storage for large amounts of data. Some of this data is often written, by a direct memory access process, into memory 1208 during execution of software in the computer system 1200. One of skill in the art will immediately recognize that the terms "computer-readable medium" and "machine-readable medium" include any type of storage device that is accessible by the processor 1204 and also encompass a carrier wave that encodes a data signal.

Network computers are another type of computer system that can be used with the embodiments of the present invention. Network computers do not usually include a hard disk or other mass storage, and the executable programs are loaded from a network connection into the memory 1208 for execution by the processor 1204. A Web TV system, which is known in the art, is also considered to be a computer system according to the embodiments of the present invention, but it may lack some of the features shown in FIG. 12, such as certain input or output devices. A typical computer system will usually include at least a processor, memory, and a bus coupling the memory to the processor.

It will be appreciated that the computer system 1200 is one example of many possible computer systems, which have different architectures. For example, personal computers based on an Intel microprocessor often have multiple buses, one of which can be an input/output (I/O) bus for the peripherals and one that directly connects the processor 1204 and the memory 1208 (often referred to as a memory bus). The buses are connected together through bridge components that perform any necessary translation due to differing bus protocols.

It will also be appreciated that the computer system 1200 is controlled by operating system software, which includes a file management system, such as a disk operating system, which is part of the operating system software. One example of an operating system software with its associated file management system software is the family of operating systems known as Windows® from Microsoft Corporation of Redmond, Wash., and their associated file management systems. The file management system is typically stored in the non-volatile storage 1214 and causes the processor 1204 to execute the various acts required by the operating system to input and output data and to store data in memory, including storing files on the non-volatile storage 1214.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computerized method comprising:
   receiving, with a multimedia database system, influence information associated with a plurality of artists, the influence information comprising data that represents influence relationships between pairs of the plurality of artists;
   generating a first directed graph from the influence information, the first directed graph comprising nodes and edges, where each node represents an artist, and where a pair of nodes is coupled with a directed edge, the directed edge representing an influence of a first artist represented by a first node on a second artist represented by a second node;
   computing artist influence data for each of the artists, where the computing uses the first directed graph and the artist influence data includes information for an artist that influences another artist when the corresponding nodes are not coupled by a directed edge; and
   generating, with a multimedia database system, a second directed graph using the first directed graph and the artist influence data.

2. The computerized method of claim 1, where generating the second directed graph further comprises:
   adding an artist node to the second directed graph, where the artist node represents a first artist selected from the plurality of artists;
   adding an influence node to the second directed graph, where the influence node represents a second artist that influences the first artist, where the size of the influence node depends on the second artist's computed influence data associated with the first artist; and
   adding a first edge to the second directed graph, where the first edge couples the artist node to the influence node and represents the influencing node influencing the artist node.

3. The computerized method of claim 1, where generating the second directed graph further comprises:
   adding an artist node to the second directed graph, the artist node represents a first artist selected from the plurality of artists;
   adding a following node to the second directed graph, where the following node represents a second artist that follows the first artist, where the size of the following node depends on the second artist's computed following data associated with the first artist; and
   adding a first edge to the second directed graph, where the first edge couples the artist node to the influence node and represents the artist node influencing the following node.

4. The computerized method of claim 1, where generating the second directed graph further comprises:
   limiting the number of influence nodes added to the second directed graph to a pre-determined number of nodes.

5. The computerized method of claim 1, where generating the second directed graph further comprises:
   limiting the number of following nodes added to the second directed graph to a pre-determined number of nodes.

6. A non-transitory machine readable storage medium having executable instructions to cause a processor to perform a method comprising:
   receiving influence information associated with a plurality of artists, the influence information comprising data that represents influence relationships between pairs of the plurality of artists;
   generating a first directed graph from the influence information, the first directed graph comprising nodes and edges, where each node represents an artist, and where a pair of nodes is coupled with a directed edge, the directed edge representing an influence of a first artist represented by a first node on a second artist represented by a second node;
   computing artist influence data for each of the artists, where the computing uses the first directed graph and the artist influence data includes information for an artist that influences another artist when the corresponding nodes are not coupled by a directed edge; and
   generating a second directed graph using the first directed graph and the artist influence data.

7. The non-transitory machine readable storage medium of claim 6, where generating the second directed graph further comprises:
   adding an artist node to the second directed graph, where the artist node represents a first artist selected from the plurality of artists;
   adding an influence node to the second directed graph, where the influence node represents a second artist that influences the first artist, where the size of the influence node depends on the second artist's computed influence data associated with the first artist; and
   adding a first edge to the second directed graph, where the first edge couples the artist node to the influence node and represents the influencing node influencing the artist node.

8. The non-transitory machine readable storage medium of claim 6, where generating the second directed graph further comprises:
   adding an artist node to the second directed graph, the artist node represents a first artist selected from the plurality of artists;
   adding a following node to the second directed graph, where the following node represents a second artist that follows the first artist, where the size of the following node depends on the second artist's computed following data associated with the first artist; and
   adding a first edge to the second directed graph, where the first edge couples the artist node to the influence node and represents the artist node influencing the following node.

9. The non-transitory machine readable storage medium of claim 6, where generating the second directed graph further comprises:

limiting the number of influence nodes added to the second directed graph to a pre-determined number of nodes.

10. The non-transitory machine readable storage medium of claim 6, where generating the second directed graph further comprises:
limiting the number of following nodes added to the second directed graph to a pre-determined number of nodes.

11. An apparatus comprising:
means for receiving influence information associated with a plurality of artists, the influence information comprising data that represents influence relationships between pairs of the plurality of artists;
means for generating a first directed graph from the influence information, the first directed graph comprising nodes and edges, where each node represents an artist, and where a pair of nodes is coupled with a directed edge, the directed edge representing an influence of a first artist represented by a first node on a second artist represented by a second node;
means for computing artist influence data for each of the artists, where the computing uses the first directed graph and the artist influence data includes information for an artist that influences another artist when the corresponding nodes are not coupled by a directed edge; and
means for generating a second directed graph using the first directed graph and the artist influence data.

12. The apparatus of claim 11, where the means for generating the second directed graph further comprises:
means for adding an artist node to the second directed graph, where the artist node represents a first artist selected from the plurality of artists;
means for adding an influence node to the second directed graph, where the influence node represents a second artist that influences the first artist, where the size of the influence node depends on the second artist's computed influence data associated with the first artist; and
means for adding a first edge to the second directed graph, where the first edge couples the artist node to the influence node and represents the influencing node influencing the artist node.

13. The apparatus of claim 11, where the means for generating the second directed graph further comprises:
means for adding an artist node to the second directed graph, the artist node represents a first artist selected from the plurality of artists;
means for adding a following node to the second directed graph, where the following node represents a second artist that follows the first artist, where the size of the following node depends on the second artist's computed following data associated with the first artist; and
means for adding a first edge to the second directed graph, where the first edge couples the artist node to the influence node and represents the artist node influencing the following node.

14. The apparatus of claim 11, where the means for generating the second directed graph further comprises:
means for limiting the number of influence nodes added to the second directed graph to a pre-determined number of nodes.

15. The apparatus of claim 11, where the means for generating the second directed graph further comprises:
means for limiting the number of following nodes added to the second directed graph to a pre-determined number of nodes.

16. A system comprising:
a processor;
a memory coupled to the processor through a bus; and
a process executed from the memory by the processor to cause the processor to receive influence information associated with a plurality of artists, the influence information comprising data that represents influence relationships between pairs of the plurality of artists, to generate a first directed graph from the influence information, the first directed graph comprising nodes and edges, where each node represents an artist, and where a pair of nodes is coupled with a directed edge, the directed edge representing an influence of a first artist represented by a first node on a second artist represented by a second node, to compute artist influence data for each of the artists, where the computing uses the first directed graph and the artist influence data includes information for an artist that influences another artist when the corresponding nodes are not coupled by a directed edge, and to generate a second directed graph using the first directed graph and the artist influence data.

17. The system of claim 16, where to generate the second directed graph further comprises:
adding an artist node to the second directed graph, where the artist node represents a first artist selected from the plurality of artists;
adding an influence node to the second directed graph, where the influence node represents a second artist that influences the first artist, where the size of the influence node depends on the second artist's computed influence data associated with the first artist; and
adding a first edge to the second directed graph, where the first edge couples the artist node to the influence node and represents the influencing node influencing the artist node.

18. The system of claim 16, where to generate the second directed graph further comprises:
adding an artist node to the second directed graph, the artist node represents a first artist selected from the plurality of artists;
adding a following node to the second directed graph, where the following node represents a second artist that follows the first artist, where the size of the following node depends on the second artist's computed following data associated with the first artist; and
adding a first edge to the second directed graph, where the first edge couples the artist node to the influence node and represents the artist node influencing the following node.

19. The system of claim 16, where to generate the second directed graph further comprises:
limiting the number of influence nodes added to the second directed graph to a pre-determined number of nodes.

20. The system of claim 16, where to generate the second directed graph further comprises:
limiting the number of following nodes added to the second directed graph to a pre-determined number of nodes.

21. The method of claim 1, further comprising:
displaying the second directed graph.

22. The non-transitory machine readable storage medium of claim 6, where the method further comprises:
displaying the second directed graph.

23. The apparatus of claim 11, further comprising:
means for displaying the second directed graph.

24. The system of claim 16, where the process further causes the processor to display the second directed graph.

* * * * *